United States Patent [19]

Huang

[11] Patent Number: 5,228,376
[45] Date of Patent: Jul. 20, 1993

[54] SCROLL SAW

[76] Inventor: Chin-Chun Huang, No. 30-1, Chiu-She Lane, Pei-Tun Dist., Taichung City, Taiwan

[21] Appl. No.: 928,366

[22] Filed: Aug. 12, 1992

[51] Int. Cl.⁵ .............................................. B27B 19/02
[52] U.S. Cl. ........................................ 83/781; 83/786; 83/662
[58] Field of Search ................ 83/662, 781, 783, 784, 83/786, 785

[56] References Cited

U.S. PATENT DOCUMENTS

| | | | |
|---|---|---|---|
| 1,116,640 | 11/1914 | Sporleder | 83/781 |
| 4,841,823 | 6/1989 | Brundage | 83/786 X |
| 4,949,616 | 8/1990 | Chang | 83/781 X |
| 5,016,512 | 5/1991 | Huang | 83/786 X |
| 5,065,652 | 11/1991 | Legler et al. | 83/662 X |

Primary Examiner—Frank T. Yost
Assistant Examiner—Rinaldi Rada
Attorney, Agent, or Firm—Jacobson, Price, Holman & Stern

[57] ABSTRACT

A scroll saw includes a hollow elongated base having a vertical sleeve portion at the rear end portion of the base. A hollow shaft is slidably inserted in the sleeve portion. An L-shaped arm member is fixed to the hollow shaft and has a suspending bracket which hangs over the base. A worktable is horizontally above and has a lengthwise extending elongated slot. A guide screw rod has a first end connected to a hand wheel, and a second end vertically passing through the L-shaped arm member and a horizontal plate fixed to the base. Therefore, the L-shaped arm member can be moved up and down by rotating the hand wheel. Parallel driven and driving levers are respectively pivoted to the suspending bracket and the base. An elongated linking member has a first end pivoted to the driven lever and a second end extending into the hollow shaft. A longitudinal hole is formed near the second end of the linking member and has transverse positioning holes connected to the longitudinal hole. A locking pin of the driving lever detachably engages one of the positioning holes. A saw blade is vertically connected to the free ends of the driven and driving levers and passes through the slot of the worktable. A driving device is provided for driving the driving lever to move up and down, to and fro.

4 Claims, 11 Drawing Sheets

SCROLL SAW

BACKGROUND OF THE INVENTION

1. Field of the Invention

This invention relates to a scroll saw, more particularly to a scroll saw which has an adjustable working space above the worktable of the scroll saw so as to permit the processing of differently sized workpieces.

2. Description of the Related Art

Conventionally, big workpieces are processed by scroll saws which have a large working space above the worktables of the scroll saws, while small workpieces are processed by scroll saws which have a small working space above the worktable. Processing a big workpiece on a scroll saw with a small working space or a small workpiece on a scroll saw with a large working space is improper. Since the working space above the worktable of the conventional scroll saws is fixed, different sizes of scroll saws must be provided to process different sizes of workpieces. Therefore, it is not economical to process differently-sized workpieces by means of scroll saws.

SUMMARY OF THE INVENTION

It is therefore a main object of this invention to provide a scroll saw which has an adjustable working space to process different sizes of workpieces.

Accordingly, a scroll saw of this invention includes a hollow elongated base with a top portion, a flat bottom portion, a front end portion and a rearwardly inclined rear end portion. The rear end portion has a vertically upwardly extending sleeve portion formed thereon. The sleeve portion has a horizontal supporting means connected thereto and extending longitudinally above the top portion of the base. An elongated horizontal plate has a first end fixed to the rear end portion below the top portion and a second end extending below the sleeve portion. The horizontal plate has a through hole and a threaded hole formed adjacent to the second end thereof.

A worktable is horizontally mounted on the supporting means above the top portion of the base and has an elongated slot extending in a direction parallel to a lengthwise direction of the base.

A hollow shaft is slidably inserted in the sleeve portion of the base. The hollow shaft has an upper end and a lower end extending out from the sleeve portion. The lower end of the hollow shaft has a vertically extending slit formed therein. The second end of the horizontal plate is inserted into the hollow shaft through the slit of the hollow shaft, thus preventing the hollow shaft from being rotated with respect to the sleeve portion of the base.

An L-shaped arm member includes a hollow suspending bracket extending horizontally above the worktable and disposed parallel to the elongated slot of worktable, and a tubular portion extending vertically downward from the suspending bracket. The upper end of the hollow shaft is inserted into and is fixed to the tubular portion.

A guide screw rod has a first end connected to a hand wheel and a second end vertically passing through the tubular portion of the L-shaped arm member, the hollow shaft and the threaded hole of the horizontal plate.

A driven lever has a first end received in the suspending bracket and a second end extending out from the suspending bracket and located right above the slot of the worktable. The driven lever has a first pin transversely passing through an intermediate portion thereof. The first pin has two ends fixed to the suspending bracket so that the driven lever can pivot about the first pin.

A driving lever is mounted on the base adjacent to the top portion of the base and is generally parallel to the driven lever. The driving lever has a first end extending into the hollow shaft and a second end extending below the second end of the driven lever. The first end of the driving lever has a locking pin formed thereon, and a second pin transversely passing through an intermediate portion thereof. The second pin has two ends fixed to the base so that the driving lever can pivot about the second pin.

A saw blade is detachably and vertically connected to the second ends of the driven and driving levers and passes through the slot of the worktable.

An elongated linking member has a first end pivoted to the first end of the driven lever and a second end extending into the hollow shaft near the lower end of the hollow shaft. The linking member has a longitudinal hole extending from the second end to an intermediate portion of the linking member, and a predetermined number of positioning holes transversely connected to the longitudinal hole. The locking pin of the driving lever engages one of the positioning holes.

A torsional spring is mounted to a pivot point on the first end of the linking member and the first end of the driven lever, thereby urging the linking member to rotate in order to enable the locking pin of the driving lever to be retained in one of the positioning holes of the linking member.

A driving means is provided to drive one of the first and second ends of the driving lever to move upward and downward to and fro.

The driven lever is hollow and has a first extension rod extending telescopically therein. The first extension rod has an end which extends horizontally out from the second end of the driven lever and is connected to the saw blade. The driving lever is hollow and has a second extension rod extending telescopically therein. The second extension rod has an end which extends horizontally out from the second end of the driving lever and is connected to the saw blade.

Therefore, the L-shaped arm member may be raised or lowered to vary the height between the worktable and the driven lever by engaging the locking pin of the driving lever in different positioning holes of the linking member. The horizontal position of the saw blade can be adjusted by telescoping the first and second extension rods of the driven and driving levers. Thus, the working space above the worktable of the scroll saw of this invention may be adjusted to process different sizes of workpieces.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
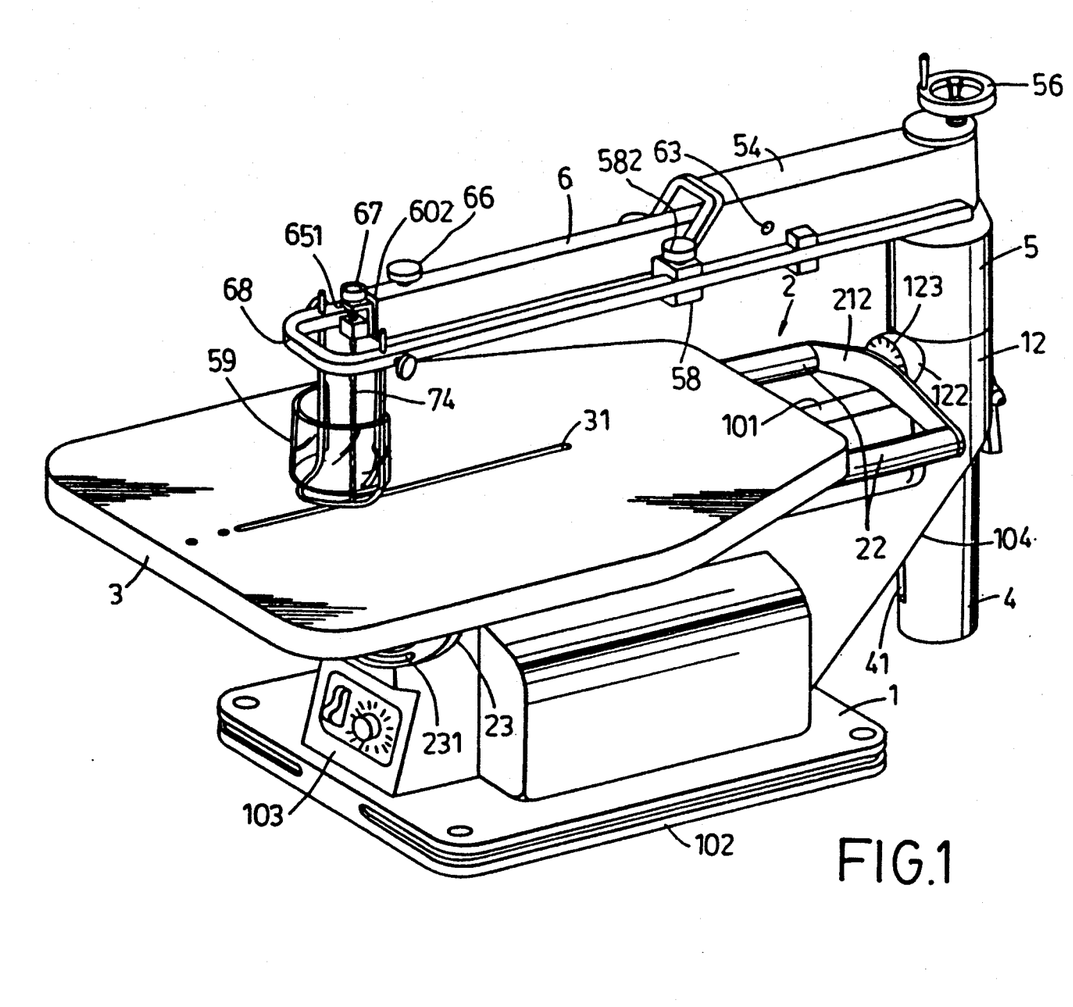
FIG. 1 is a perspective view of a preferred embodiment of a scroll saw of this invention.
Figure 2:
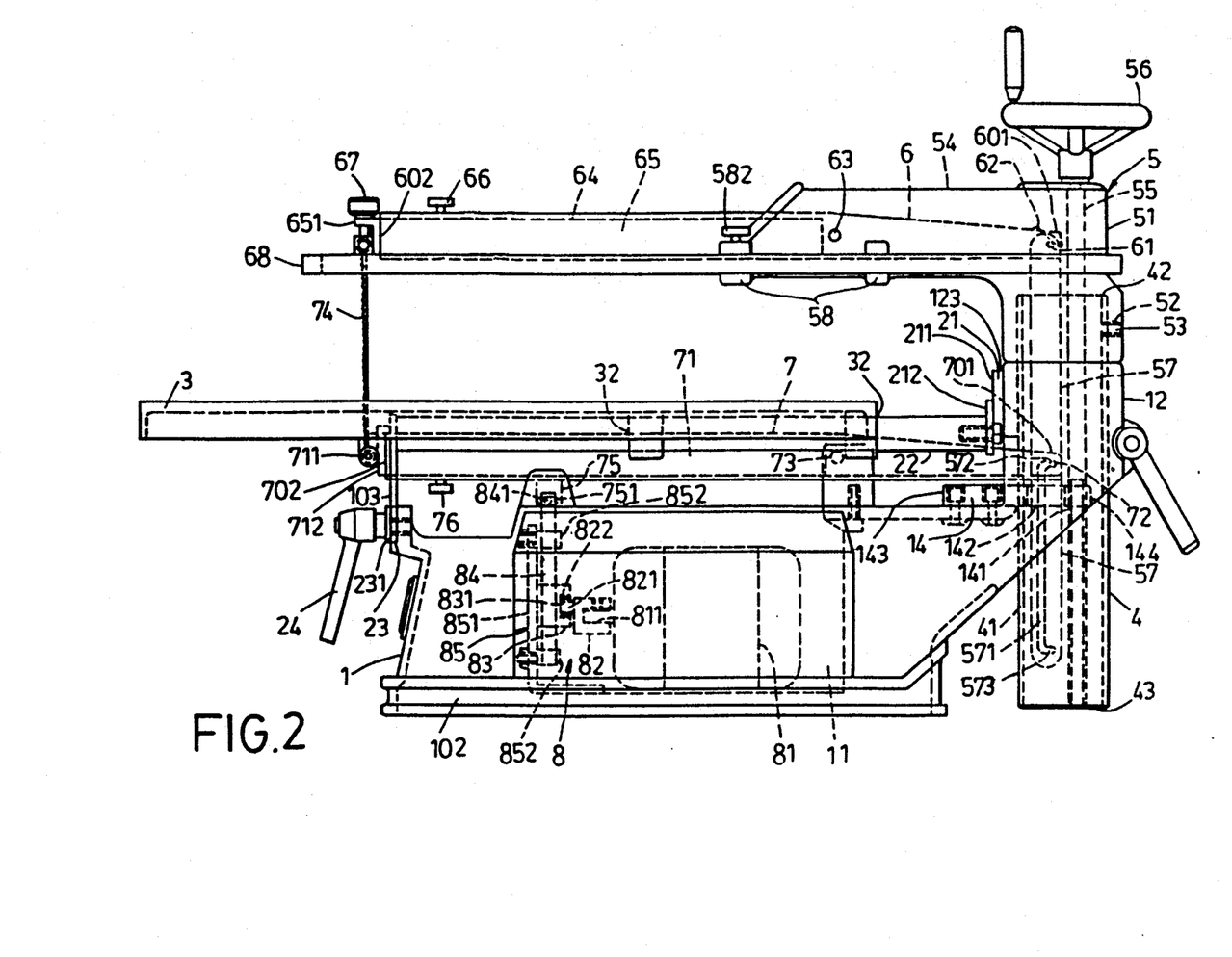
FIG. 2 is a side view of the preferred embodiment of a scroll saw of this invention.

FIGS. 1 and 2 show a preferred embodiment of a scroll saw of this invention. The scroll saw includes a hollow elongated base 1 having a top portion 101, a flat bottom portion 102 disposed on the ground, a front portion 103 and a rearwardly inclined rear end portion 104. The base 1 has a receiving room 11 therein. The rear end portion 104 has a vertically upwardly extending sleeve portion 12 formed thereon. An elongated horizontal plate 14 has a first end 143 fixed to the rear end portion 104 below the top portion 101 and a second end 144 extending below the sleeve portion 12. The horizontal plate 14 has a through hole 142 and a threaded hole 141 formed adjacent to the second end 144 of the horizontal plate 14.

A worktable 3 is horizontally mounted on a horizontal supporting means 2 above the top portion of the base 1. The worktable 3 has an elongated slot 31 which extends in a direction that is parallel to a lengthwise direction of the base 1.

Figure 3:
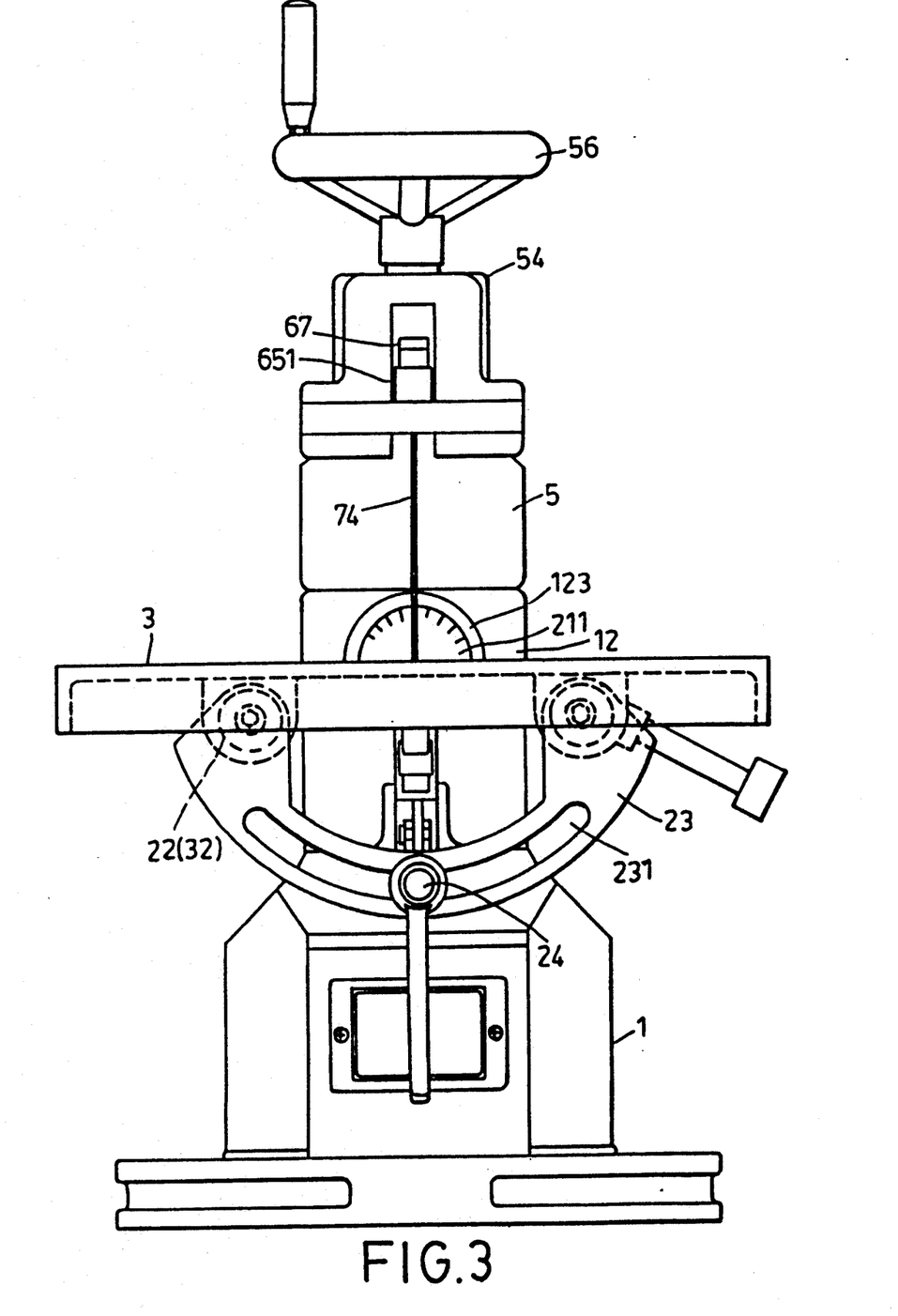
FIG. 3 is a front view of the preferred embodiment of the scroll saw of this invention.

The horizontal supporting means 2 includes a circular hollow projection 122 formed on the sleeve portion 12 near the worktable 3. The circular hollow projection 122 has an index plate 21 rotatably mounted therein. The index plate 21 has a flat face 211 having angular graduations 123 on the upper portion of the index plate 21 and a fixed arcuate plate 212 connected to the lower portion of the index plate 21. The fixed arcuate plate 212 has two ends respectively connected to two longitudinal and parallel supporting rods 22. The supporting rods 22 have two free ends respectively connected to two ends of a limit arc plate 23, as shown in FIG. 2. The limit arc plate 23 has an arcuate groove 231 formed therein, as best illustrated in FIG. 3. A positioning screw member 24 passes through the arcuate groove 231 and is connected to the front end portion 103 of the base 1. Therefore, the limit arc plate 23 can be locked or unlocked by the positioning screw member 24 in order to adjust the angle of the worktable 3 with respect to the ground. The worktable 3 has two pairs of lug members 32 (only two lug members are shown in FIG. 2) formed on the lower face of the worktable 3. Each of the lug members 32 has a through bore through which the respective supporting rod 22 passes in order to support horizontally the worktable 3.

A hollow shaft 4 is slidably inserted in the sleeve portion 12 of the base 1. The hollow shaft 4 has an upper end 42 and a lower end 43 extending out from the sleeve portion 12. The lower end 43 of the hollow shaft 4 has a vertically extending slit 41 formed therein. The second end 144 of the horizontal plate 14 is inserted into the hollow shaft 4 through the slit 41 of the hollow shaft 4, thereby preventing the hollow shaft 4 from being rotated with respect to the sleeve portion 12 of the base 1 in order to allow the hollow shaft 4 to be moved vertically with respect to the sleeve portion 12.

An L-shaped arm member 5 includes a hollow suspending bracket 54 extending horizontally above the worktable 3 and disposed parallel to the elongated slot 31 of the worktable 3, and a tubular portion 51 extending vertically downward from the suspending bracket 54. The upper end 42 of the hollow shaft 4 is inserted into and is fixed to the tubular portion 51 of the L-shaped arm member 5 by a fixing screw 53 which passes through a bore 52 that is formed in the tubular portion 51.

A guide screw rod 55 has a first end connected to a hand wheel 56 and a second end which passes vertically through the tubular portion 51 of the L-shaped arm member 5, the hollow shaft 4 and the threaded hole 141 of the horizontal plate 4. Therefore, the L-shaped arm member 5 and the hollow shaft 4 can be moved up and down by rotating the hand wheel 56

A driven lever 6 has a first end 601 received in the suspending bracket 54 and a second end 602 extending out from the suspending bracket 54 and located right above the slot 31 of the worktable 3. The driven lever 6 has a first pin 63 transversely passing through an intermediate portion thereof. The first pin 63 has two ends fixed to the suspending bracket 54 so that the driven lever 6 can pivot about the first pin 63.

A driving lever 7 is mounted on the base 1 adjacent to the top portion 101 of the base 1 and generally paralleled to the driven lever 6. The driving lever 7 has a first end 701 extending into the hollow shaft 4 and a second end 702 extending below the second end 602 of the driven lever 6. The first end 701 of the driving lever 7 has a locking pin 72 connected thereon, and a second pin 73 transversely passing through an intermediate portion thereof. The second pin 73 has two ends fixed to the base 1 so that the driving lever 7 can pivot about the second pin 73.

The driven lever 6 has a first blind bore 64 extending from the second end 602 thereof and a first extension rod 65 extending telescopically in the first blind bore 64. The first extension rod 65 has an end 651 which extends horizontally out from the second end 602 of the driven lever 6. An adjusting member 67 is screwed to the end 651 of the extension rod 65. The suspending bracket 54 has several clamping blocks 58 connected thereto. A U-shaped protecting frame 68 is horizontally and slidably clamped by the clamping blocks 58 around the driven lever 6 and the suspending bracket 54, as best illustrated in FIG. 1. A locking screw 582 is provided on one of the clamping blocks 58 in order to position the U-shaped protecting frame 68. The driving lever 7 has a structure similar to that of the driven lever 6. A second extension rod 71 extends telescopically in the driving lever 7 and has an end 712 which extends horizontally out from the second end 702 of the driving lever 7 The end 712 of the second extension rod 71 has an engaging member 711 fixed thereto. Two locking screws, 66 and 76, are respectively provided on the driven lever and the driving lever, 6 and 7, in order to position the first and second extension rods, 65 and 71.

A saw blade 74 is detachably and vertically connected to the adjusting member 651 and the engaging member 711 and passes through the slot of the worktable 3. Rotation of the adjusting member 651 can keep the saw blade 74 under tension or release the saw blade 74 so as to remove the same. A protecting cover 59 is provided around the saw blade 74 in order to protect the user when the scroll saw is in use.

Figure 4:
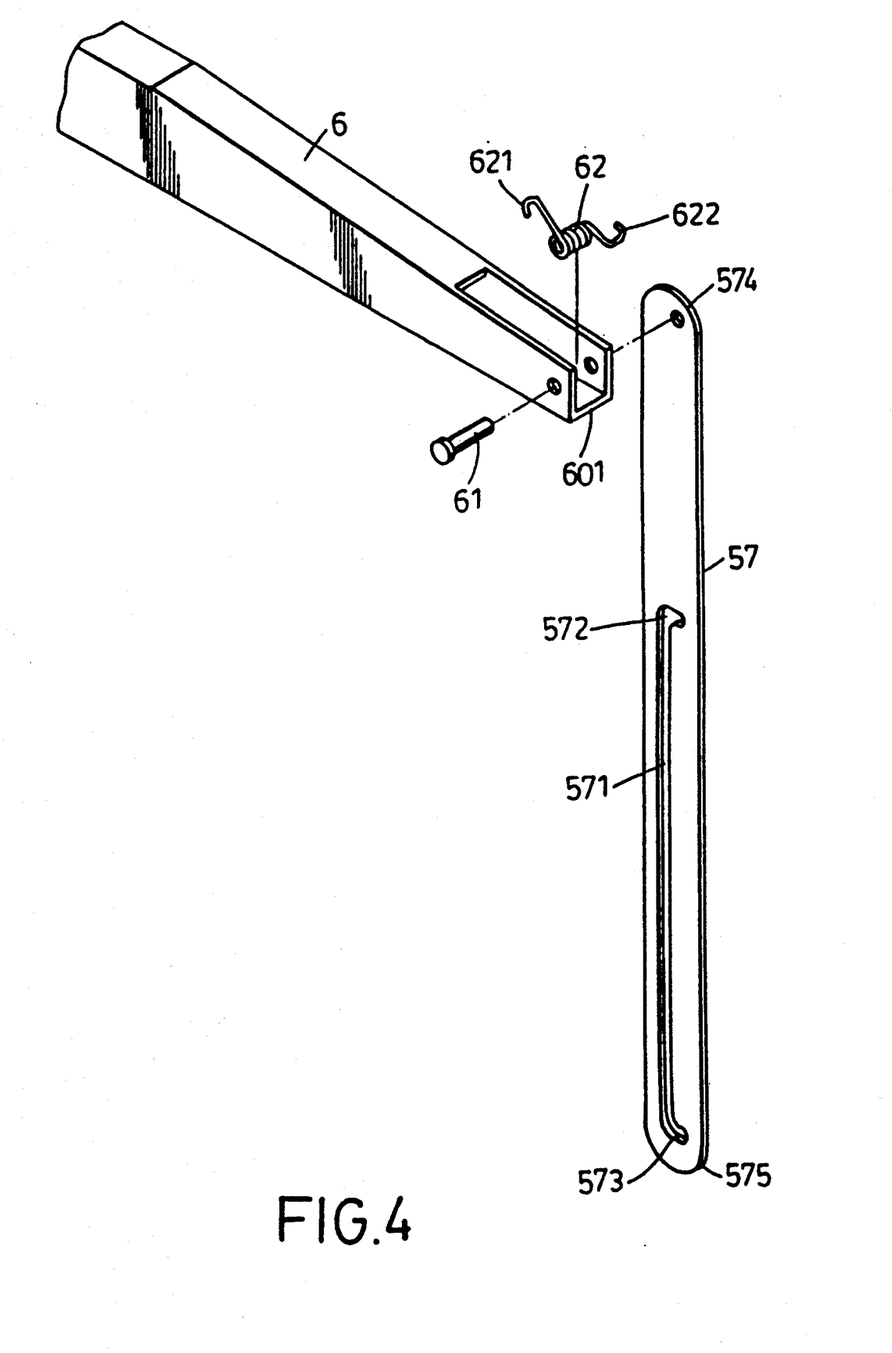
FIG. 4 is a perspective exploded view of a driven lever and a linking member of the scroll saw of this invention.

An elongated linking member 57 has a first end 574 pivoted to the first end 601 of the driven lever 6 by means of a pivot pin 61 and a second end 575 which extends into the hollow shaft 4 near the lower end 43 of the hollow shaft 4. The linking member 57 has a longitudinal hole 571 extending from the second end 575 to an intermediate portion of the linking member 57. Two positioning holes, 572 and 573, are transversely connected to the upper and lower ends of the longitudinal hole 571, as best illustrated in FIG. 4. The locking pin 72 of the driving lever 7 engages one of the positioning holes 572, as shown in FIG. 2. The linking member 57 passes through the through hole 142 of the horizontal plate so that movement of the linking member 57 can be kept in a vertical direction.

Figure 5:
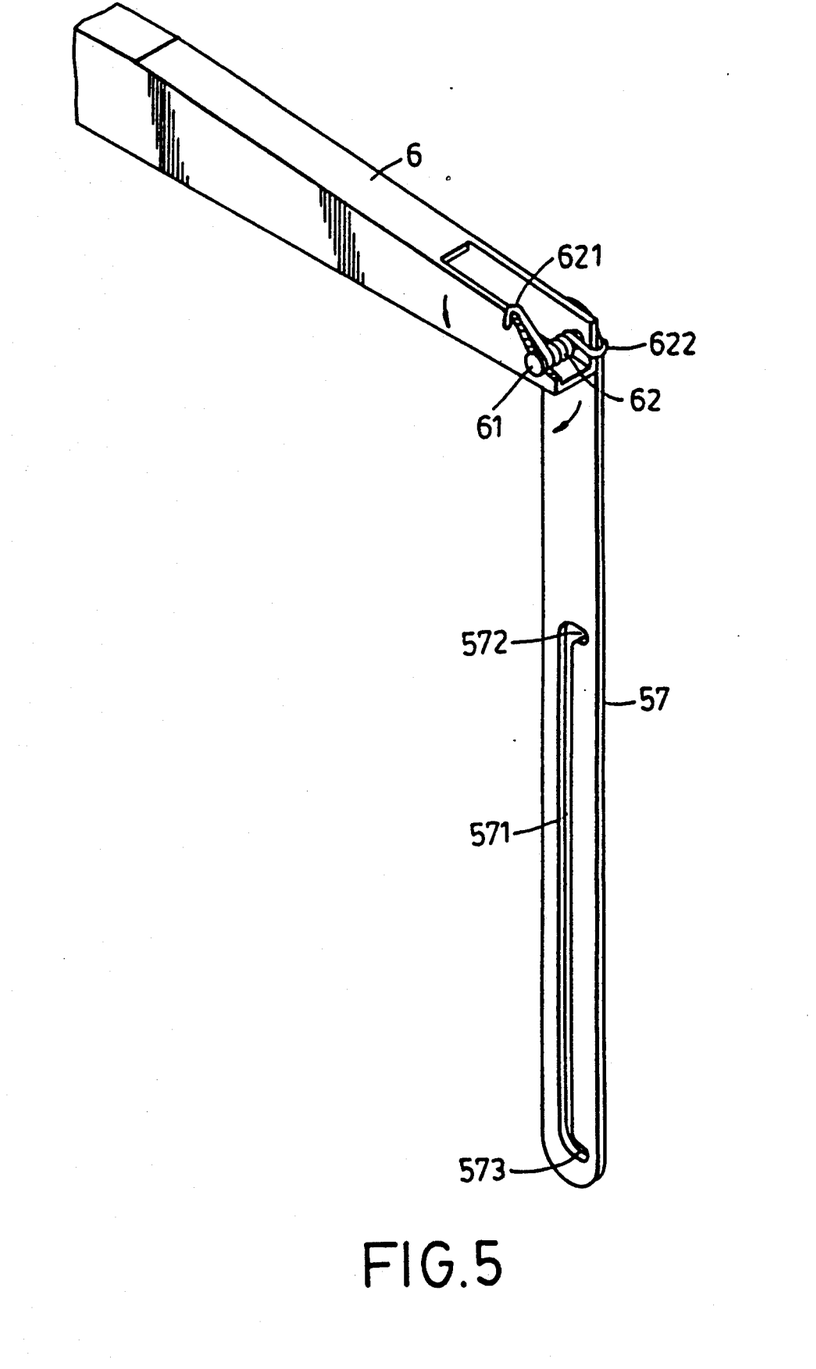
FIG. 5 is a perspective view showing the driven lever being pivoted to the linking member of the scroll saw of this invention.

Referring to FIGS. 4 and 5, a torsional spring 62 is mounted to the pivot pin 61 and has two ends, 621 and 622, respectively hooked on the driven lever 6 and the liking member 57, thereby urging the linking member 57 to rotate clockwise in order to enable the locking pin 72 of the driving lever 7 to be retained in one of the positioning holes 574 of the linking member 57.

Figure 6:
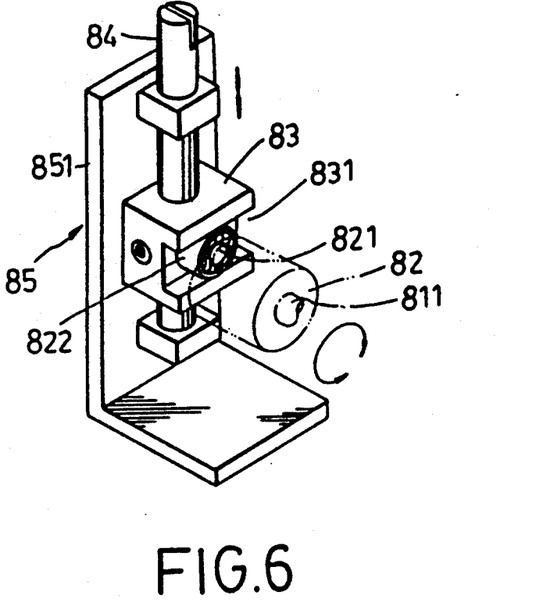
FIG. 6 is a perspective schematic view showing the driving means of the scroll saw of this invention in a first operative position.
Figure 7:
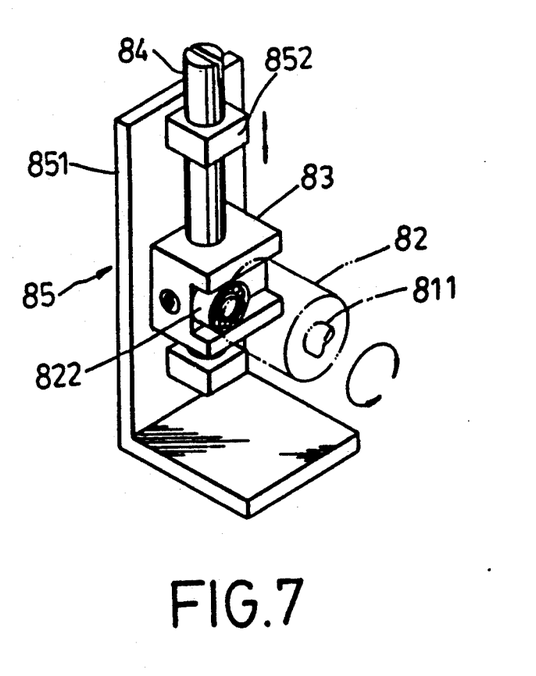
FIG. 7 is a perspective schematic view of the driving means of the scroll saw of this invention in a second operative position.
Figure 8:
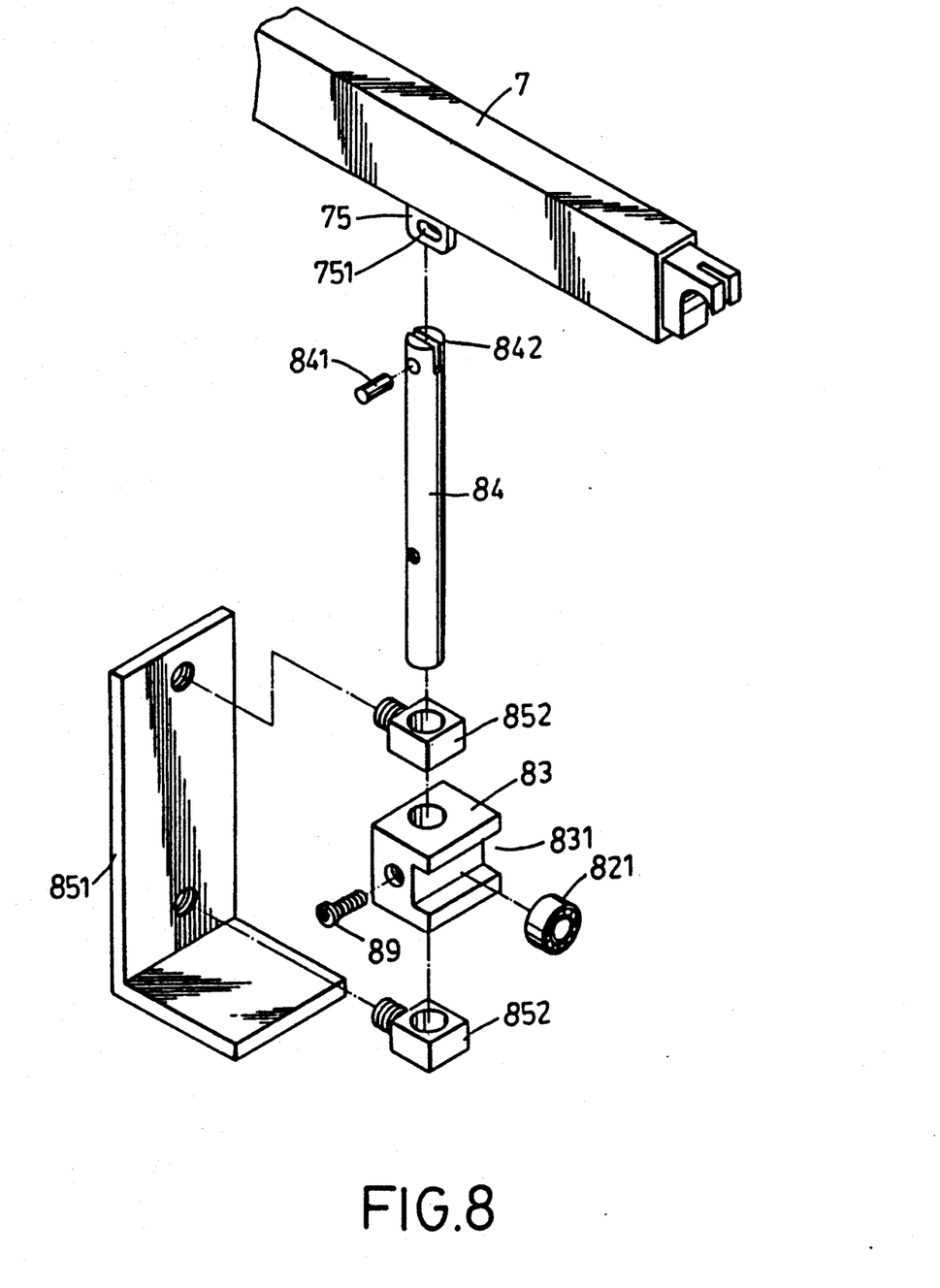
FIG. 8 is a perspective view of the driving means and the driving lever of the scroll saw of this invention.
Figure 9:
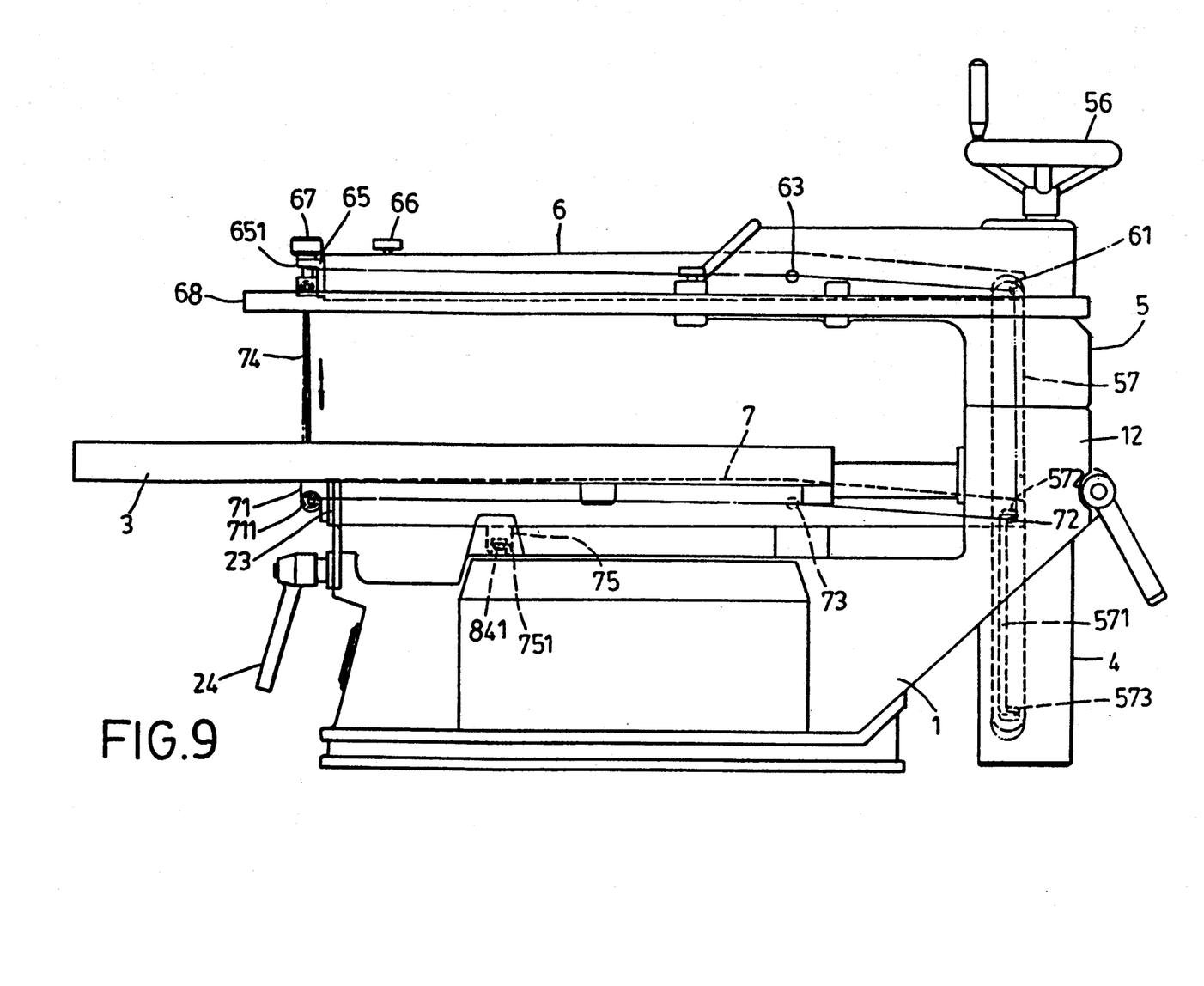
FIG. 9 is a schematic side view showing the scroll saw of this invention in a first operative position.

Referring to FIG. 2, a driving means 8 is provided in the receiving room 11 of the base 1 for driving the second end of the driving lever 7 to move upward and downward, to and fro. The driving means 8 includes a motor 81 having a driving shaft 811. A cylindrical rotor 82 is journalled on the driving shaft 811 and has an eccentric rod 821 which extends from one end of the rotor 82. The eccentric rod 821 has a bearing 822 mounted thereon. An L-shaped mounting plate 85 is fixed to the bottom portion 102 of the base 1. The mounting plate 85 has an upright portion 851 with two limiting blocks 852 screwed thereto, as shown in FIG. 8. An actuating rod 84 slidably passes through the two limiting blocks 852 and is disposed parallel to the upright portion 851 of the mounting plate 85 so that the actuating rod 84 can move vertically with respect to the flat bottom portion 102 of the base 1. The actuating rod 84 has an upper end 842 which is pivoted by a pin 841 to a downward projection 75 with an oval slot 751 that is formed on the driving lever 7 adjacent to the second end 702 of the driving lever 7. A driving block 83 is fixed by a screw member 89 to the actuating rod 84 between the two limiting blocks 852. The driving block 83 has a sliding groove 831 formed therein. The sliding groove 831 extends in a direction transverse to the moving direction of the actuating rod 84. The bearing 821 is received in the sliding groove 831 so that when the motor 81 is actuated to rotate the rotor 82, the bearing 821 can slide transversely to and fro in the sliding groove 831, thereby enabling the actuating rod 84 to move up and down, to and fro, as illustrated in FIGS. 6 and 7. When the actuating rod 84 moves up and down, to and fro, the driving lever 7 will pivot about the second pin 73 to drive the linking member 57 to move up and down, to and fro. The driven lever 6 is then pivoted about the first pin 63, thereby driving the saw blade 74 to move up and down, to and fro in order to accomplish a sawing process, as best illustrated in FIG. 9.

Figure 10:
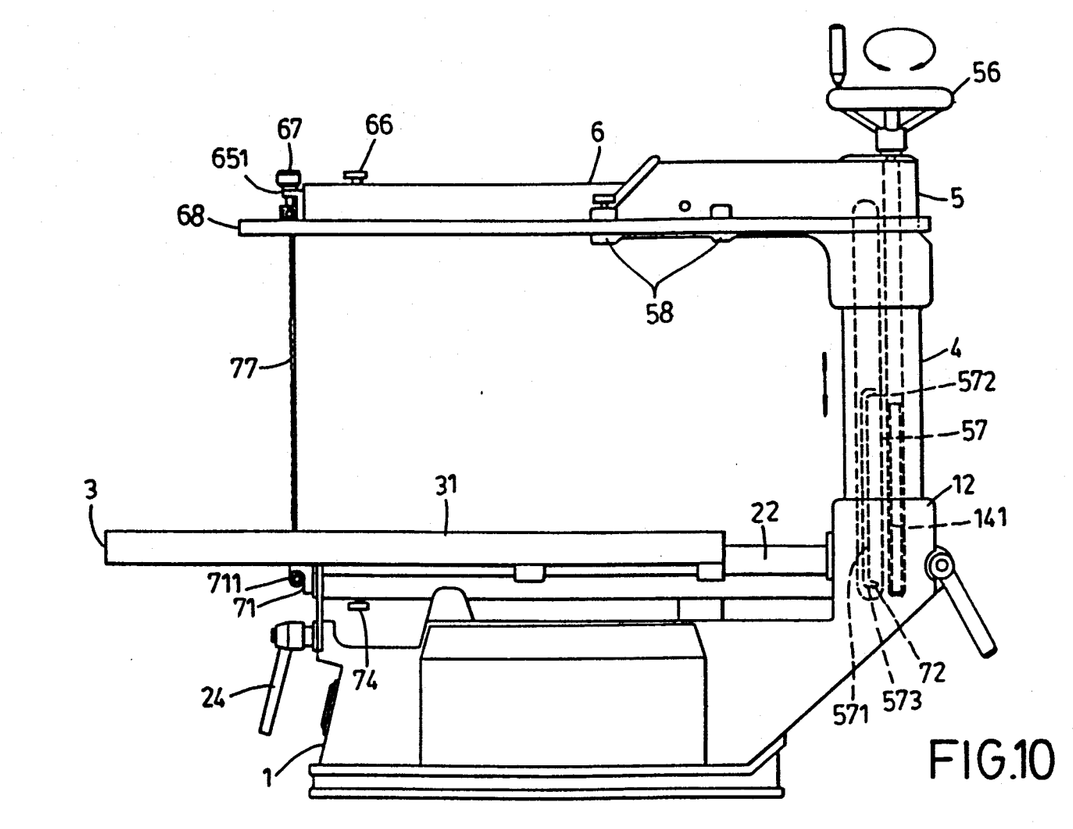
FIG. 10 is a schematic side view showing the scroll saw of this invention in a second operative position.

When processing a large workpiece, the saw blade 74 is removed from the first and second extension rods, 65 and 71. The locking pin 72 is disengaged from the positioning hole 572 by moving the lower end 575 of the linking member 57 by means of a finger or a tool that is inserted into the lower end 43 of the hollow shaft 4. Meanwhile, the hand wheel 56 is rotated to move the L-shaped arm member 5 upwardly until the locking pin 72 slides along the longitudinal hole 71 and engages the position hole 573 by means of the torsional force of the torsional spring 62. A longer saw blade 77 is connected to the adjusting member 651 and the engaging member 711. The working space above the worktable 3 is therefore increased in the vertical direction, as best illustrated in FIG. 10. When a small workpiece is to be processed, the L-shaped arm member 5 can be lowered in a reverse operation in order to obtain a proper working space above the worktable 3.

Figure 11:
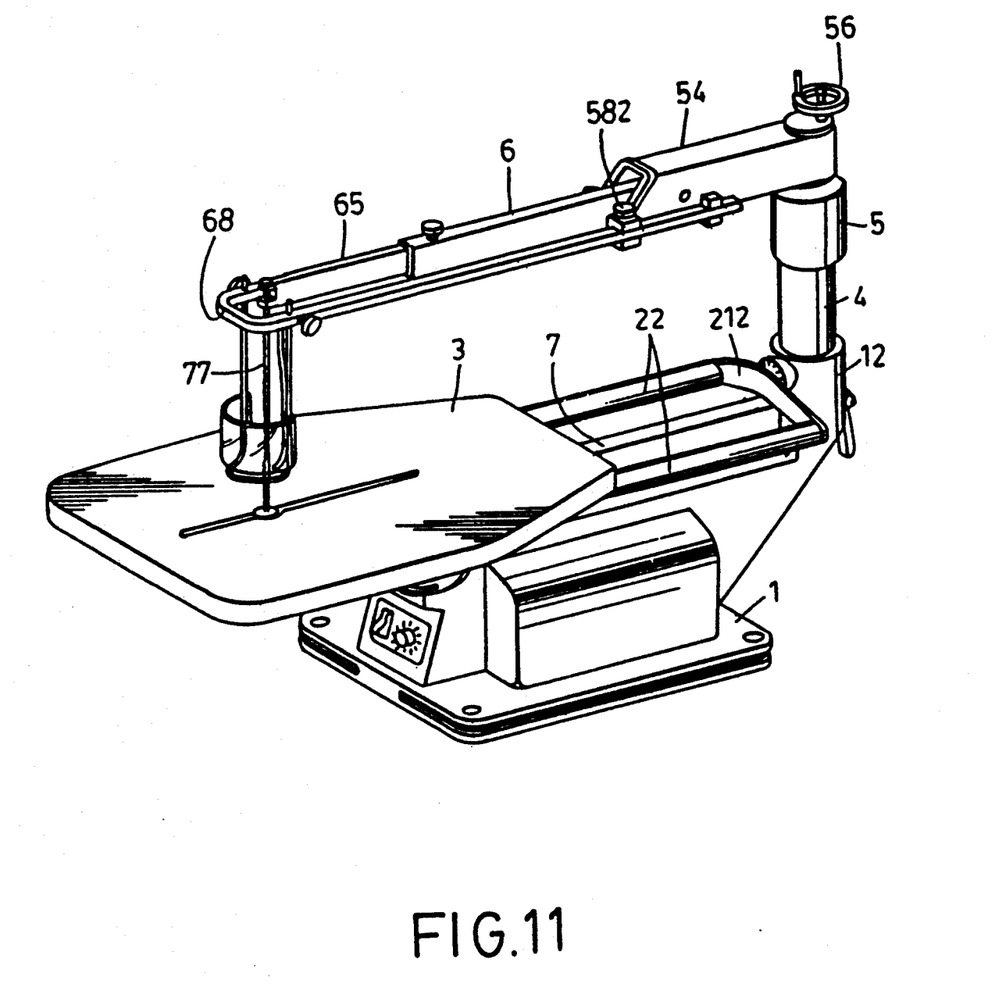
FIG. 11 is a perspective view of the scroll saw of this invention in a third operative position.
Figure 12:
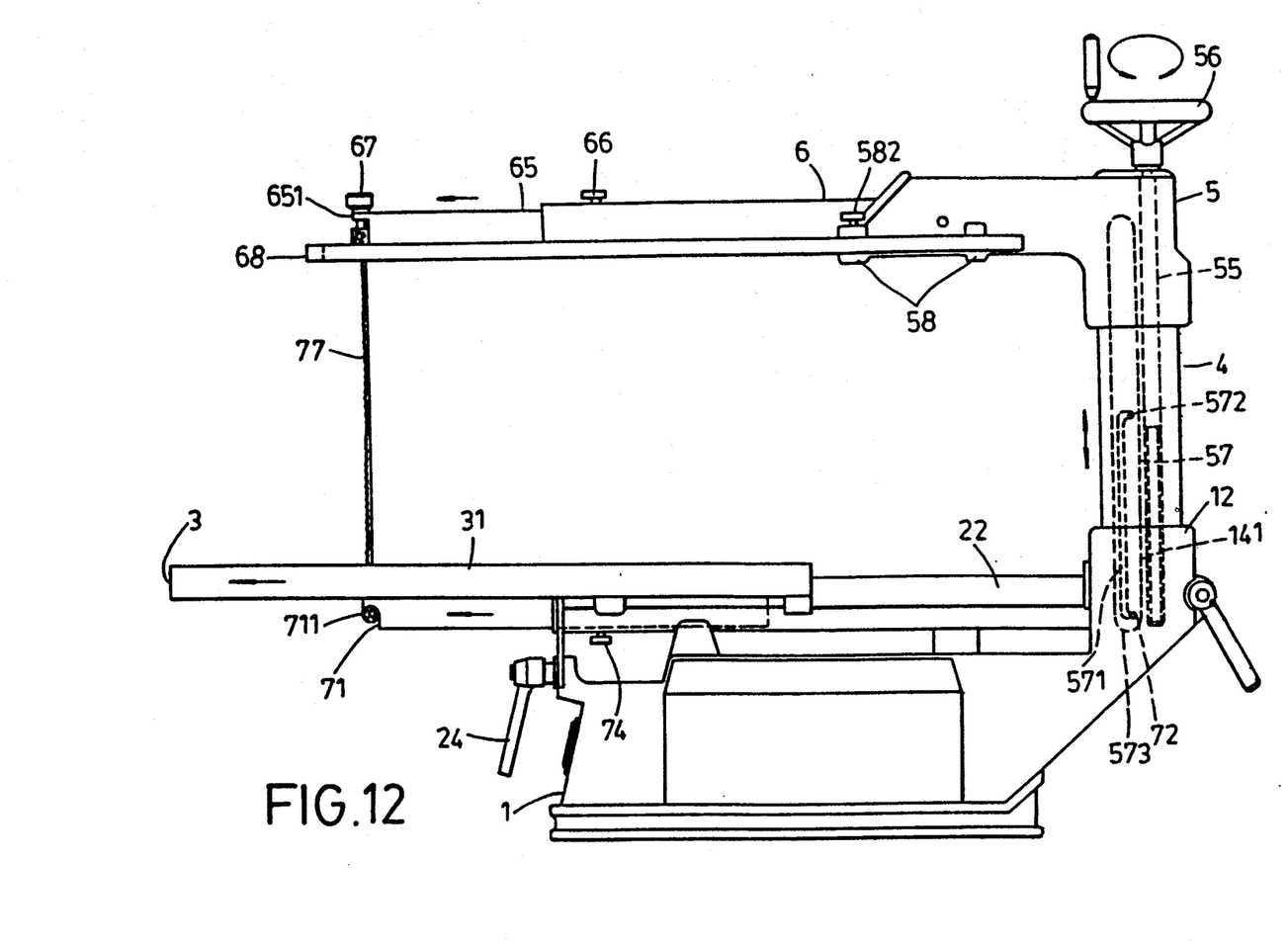
FIG. 12 is a schematic side view showing the scroll saw of this invention in the third operative position.

Further, the first and second extension rods, 65 and 71, may be pulled out from the driven and driving levers, 6 and 7, by releasing the locking screws, 66 and 74, so as to increase the working space above the worktable 3 in the horizontal direction, as best illustrated in FIGS. 11 and 12. Of course, the protecting frame 68 should be pulled leftward to surround the first extension rod 6 after the locking screw 582 is released.

Therefore, the L-shaped arm member 5 may be raised or lowered to vary the height between the worktable 3 and the driven lever 6 by engaging the locking pin 72 of the driving lever in different positioning holes, 572 and 573, of the linking member 57. The horizontal position of the saw blade can be adjusted by telescoping the first and second extension rods, 65 and 71, of the driven and diving levers, 6 and 7. Thus, the working space above the worktable of this invention may be adjusted to process differently-sized workpieces.

With this invention thus explained, it is apparent that numerous modifications and variations can be made without departing from the scope and spirit of this invention. It is therefore intended that this invention be limited only as indicated in the appended claims.

I claim:

1. A scroll saw, comprising:
a hollow elongated base having a top portion, a flat bottom portion, a front end portion and a rearwardly inclined rear end portion, said rear end portion having a vertically upwardly extending sleeve portion formed thereon, said sleeve portion having a horizontal supporting means connected thereto and extending longitudinally above said top portion of said base, and an elongated horizontal plate having a first end fixed to said rear end portion below said top portion and a second end extending below said sleeve portion, said horizontal plate having a through hole and a threaded hole formed adjacent to said second end thereof;
a worktable horizontally mounted on said horizontal supporting means above said top portion of said base and having an elongated slot extending in a direction parallel to a lengthwise direction of said base, the function of said horizontal supporting means being to provide horizontal support for the worktable while maintaining the horizontal orientation of said worktable;

a hollow shaft slidably inserted in said sleeve portion of said base, said hollow shaft having an upper end and a lower end extending out from said sleeve portion, said lower end of said hollow shaft having a vertically extending slit formed therein, said second end of said horizontal plate being inserted into said hollow shaft through said slit of said hollow shaft, thus preventing said hollow shaft from being rotated with respect to said sleeve portion of said base;

an L-shaped arm member including a hollow suspended bracket extending horizontally above said worktable and disposed parallel to said elongated slot of said worktable, and a tubular portion extending vertically downward from said suspended bracket, said upper end of said hollow shaft being inserted into and being fixed to said tubular portion, said hollow suspended bracket being suspended from said tubular portion;

a guide screw rod having a first end connected to a hand wheel and a second end vertically passing through said tubular portion of said L-shaped arm member, said hollow shaft and said threaded hole of said horizontal plate;

a driven lever having a first end received in said suspended bracket and a second end extending out from said suspended bracket and located right above said slot of said worktable, said driven lever having a first pin transversely passing through an intermediate portion thereof, said first pin having two ends fixed to said suspended bracket so that said driven lever can pivot about said first pin;

a driving lever mounted on said base adjacent to said top portion of said base and being generally parallel to said driven lever, said driving lever having a first end extending into said hollow shaft and a second end extending below said second end of said driven lever, said first end of said driving lever having a locking pin formed thereon, and a second pin transversely passing through an intermediate portion thereof, said second pin having two ends fixed to said base so that said driving lever can pivot about said second pin;

a saw blade detachably and vertically connected to said second ends of said driven and said driving levers and passing through said slot of said worktable;

an elongated linking member having a first end pivoted to said first end of said driven lever and a second end extending into said hollow shaft ear said lower end of said hollow shaft, said linking member having a longitudinal hole extending from said second end to an intermediate portion of said linking member, and a predetermined number of positioning holes transversely connected to said longitudinal hole, said locking pin of said driving lever engaging one of said positioning holes;

a torsional spring mounted to a pivot point on said first end of said linking member and said first end of said driven lever, thereby urging said linking member to rotate in order to enable said locking pin of said driving lever to be retained in one of said positioning holes of said linking member; and means for driving one of said first and second ends of said driving lever to move upward and downward, to and fro.

2. A scroll saw as claimed in claim 1, wherein said driven lever has a first blind bore extending from said second end thereof and a first extension rod telescopically extending in said first blind bore, said first extension rod having an end which extends horizontally out from said second end of said driven lever and which is connected to said saw blade; and wherein said driving lever has a second blind bore extending from said second end thereof and a second extension rod telescopically extending in said second blind bore, said second extension rod having an end which extends horizontally out from said second end of said driving lever and which is connected to said saw blade.

3. A scroll saw as claimed in claim 1, wherein said horizontal supporting means includes a circular hollow projection formed on said sleeve portion near said worktable, said circular hollow projection having an index plate rotatably mounted therein, said index plate having a flat face facing said saw blade, said flat face of said index plate having an upper portion provided with angular graduations and a lower portion having a fixed arcuate plate connected thereto, said fixed arcuate plate having two ends respectively connected to two longitudinal and parallel supporting rods, said supporting rods having two free ends respectively connected to two ends of a limit arc plate, said limit arc plate having an arcuate groove formed therein, a positioning screw member passing through said arcuate groove and being connected to said front end portion of said base, said worktable having a pair of lug members formed on a lower face thereof, each of said lug members having a through bore through which a respective one of said supporting rods passes.

4. A scroll saw as claimed in claim 1, wherein said driving means is mounted on said base and includes a motor having a driving shaft, a cylindrical rotor journalled on said driving shaft and having an eccentric rod extending from one end of said rotor, said eccentric rod having a bearing mounted thereon, an L-shaped mounting plate fixed to said bottom portion of said base, said mounting plate having an upright portion with two limiting blocks fixed thereto, an actuating rod slidably passing through said two limiting blocks and disposed parallel to said upright portion of said mounting plate so that said actuating rod can move vertically with respect to said flat bottom portion of said base, said actuating rod having an upper end pivoted to said driving lever adjacent to said second end of said driving lever, and a driving block fixed to said actuating rod between said two limiting blocks, said driving block having a sliding groove formed therein and extending in a direction transverse to the moving direction of said actuating rod, said bearing being received in said sliding groove so that when said motor is actuated to rotate said rotor, said bearing can slide transversely to and fro in said sliding groove, thereby enabling said actuating rod to move up and down, to and fro.

* * * * *